Jan. 2, 1951 S. RUBEN 2,536,697
PRIMARY CELL AND BATTERY
Filed April 9, 1946
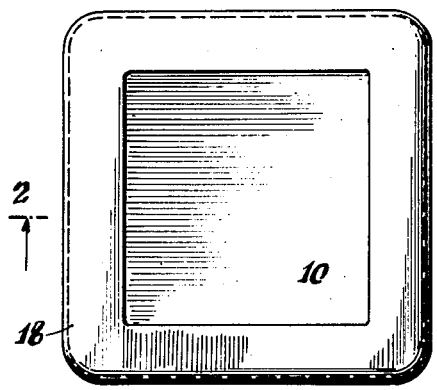
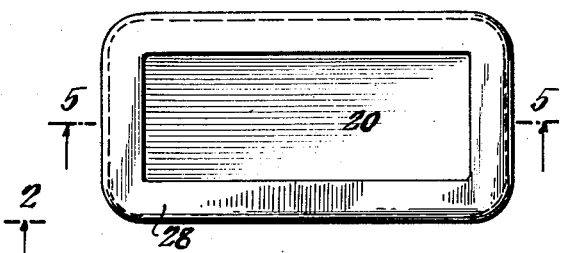
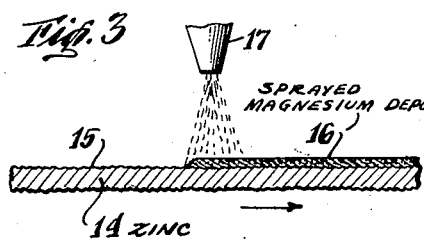
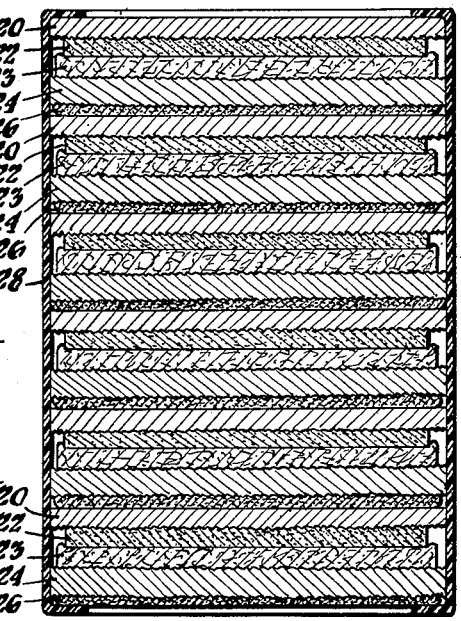
INVENTOR
Samuel Ruben
BY
ATTORNEY Patented Jan. 2, 1951

2,536,697

UNITED STATES PATENT OFFICE 2,536,697

PRIMARY CELL AND BATTERY

Samuel Ruben, New Rochelle, N. Y.

Application April 9, 1946, Serial No. 660,617

13 Claims. (Cl. 136—111)

This invention relates to primary cells and batteries.

An object of the invention is to improve the structure and composition of primary cells and batteries.

Other objects will be apparent from the following description and claims.

In the drawings:

Figure 1 is a face view of a primary cell embodying features of the invention;

Figure 2 is a section on line 2—2 of Figure 1;

Figure 3 illustrates a step in the making of one of the cell terminals;

Figure 4 is an end view of a primary battery embodying features of the invention;

Figure 5 is a section on the line 5—5 of Figure 4; and

Figure 6 is a section through a modified cell terminal.

The present invention contemplates an alkaline primary cell or battery in which at least one of the contacts is of magnesium. In one embodiment the magnesium is in the form of a layer sprayed onto one of the cell elements. It is also contemplated that the layer be impregnated with a water repellent fluid, such as oil. Other features of the invention reside in the construction of the cells and batteries and casings therefor.

Figures 1 and 2 show an alkaline dry cell of generally rectangular shape comprising a stack assembly of plate-like members comprising the cell elements. The positive terminal of the cell comprises a steel plate 10 which has been sandblasted on one surface 11. The cathode-depolarizer electrode of the cell comprises a conductive layer 12 of depolarizing composition pressed onto the sandblasted surface 11. One suitable composition comprises an intimate mixture of finely-divided mercuric oxide powder with 5% micronized graphite.

The cell electrolyte-spacer member comprises a sheet 13 of absorbent sheet material, such as the felted cotton fibre paper known as Feltril paper, impregnated with the electrolyte. The preferred electrolyte is an alkali metal hydroxide solution immobilized as a gel. One such electrolyte is formed of:

Chemically pure potassium hydroxide (88%
  KOH) _____grams__ 100
Zinc oxide_____do____ 16
Sodium carboxymethylcellulose_____do____ 6
Water _____ml__ 100

The potassium hydroxide is added to 25 ml. of water and the zinc oxide added. The mixture is stirred and heated to 180–190° C. and then allowed to cool to 110° C., after which 25 ml. of water is added and the solution stirred and cooled to 80° C. The remaining 50 ml. of water is added, a clear solution being obtained. The sodium carboxymethylcellulose is crushed and screened through a 40 mesh screen and is added slowly to the solution, with constant stirring.

The sheet of paper or other absorbent material is immersed in this solution and then placed in a stainless steel mold under slight pressure. The mold is heated close to the boiling point of the solution (about 117–120° C.). It is of advantage to apply alternate pressure and vacuum stages to thoroughly impregnate the pores of the paper. Upon cooling, the solution sets to a stiff gel in the pores of the paper. Spacer element 13 of the required size and shape is then punched from this sheet.

The anode 14 comprises a zinc plate which has been sandblasted or otherwise roughened on both faces. According to the present invention the outer face 15 is coated with a layer 16 of magnesium integrally bonded thereto, applied by metal spraying, as in the Schoop process. As those skilled in the art know, magnesium can be readily sprayed by this process, provided that certain precautions are observed. Thus, the spraying temperature is so controlled that while it is sufficient to melt the magnesium wire, it is below the temperature at which the magnesium would ignite. Preferably, a suitable inert gas, such as nitrogen, helium or argon, is used for the spraying in order to prevent oxidation of the finely divided magnesium particles.

Figure 3 illustrates such a coating step in which a strip of the sandblasted zinc 14, is led past the nozzle 17 of a metallizing gun which sprays molten magnesium particles onto the surface 15 to form layer 16. The electrode elements of desired size and shape are cut from the strip.

The assembled cell elements are held together under pressure by a sleeve 18 of plastic material which is tightly drawn or shrunk over the stack. According to one method a tube of Vinylite (vinyl acetate-vinyl chloride copolymer) of substantially smaller diameter than the width of the cell plates, is heated, stretched and finally shrunk onto the cell. This may be accomplished by placing the Vinylite tube in water heated to 100° C., then stretching it onto a form while hot and pliant, and suddenly cooling it in cold water while in expanded form. The stretched tube is then removed from the form and dried while still in expanded condition. The dried expanded tube is placed around the cell stack assembly and is heated to 55° C. which causes it to shrink tightly around the stack of cell elements, the ends of the tube being drawn down flat against the end faces of the stack, as shown. No other sealing or tensioning means are required.

The completed cell can be mounted for use by insertion between a pair of contact springs, or a number of the cells can be stacked up, with interposed contact discs if necessary, to form a battery of the desired voltage.

In prior alkaline cells considerable difficulty has been encountered from corrosion of the zinc surface where it is exposed to air. This trouble has been accentuated due to the tendency of alkaline electrolytes to creep along the surface of the zinc terminal under the sealing grommet or other sealing means to the exposed outer surfaces. Where the zinc is placed in contact with steel, as when cells are stacked to form a battery, the contact joint between the zinc and steel is subject to material local galvanic action and polarization. I have found that the magnesium contact layer avoids these difficulties, due to the low contact potential difference between zinc and magnesium and to the immunity of magnesium to alkali corrosion.

According to another aspect of the invention the magnesium coating is still further improved by impregnating it with an inert water repellent material, such as mineral oil, paraffin, silicone resin or liquid or coal tar oils such as the hydronapthalenes. This prevents practically all electrolyte creepage and preserves a good contacting surface, particularly against the steel surface which would otherwise develop a contact polarization drop if wetted by electrolyte.

Figures 4 and 5 illustrate a battery formed of a stack of flat cells of the type described all enclosed in a single plastic sleeve 28. The plates of the cells are shown as rectangular although it is obvious that they may be square, circular or of other shapes. Each cell in the stack comprises a steel terminal plate 20, a layer 22 of depolarizer material bonded thereto, an electrolyte-spacer layer 23, a zinc plate 24 and a sprayed magnesium layer 26 impregnated with oil.

Figure 6 illustrates a modified steel terminal plate 30 in which the outer face, as well as the inner, has been sandblasted. This outer face is coated with a layer 31 of sprayed magnesium. Plates 30 may be substituted for plate 10 in Figure 2 and for plates 20 in Figure 5. The magnesium layer may be oil impregnated.

It is obvious that features of the invention can be applied to a variety of alkaline cell structures. For example, the zinc electrode and zinc terminal may be separate elements which are in contact within the cell.

What is claimed is:

1. A primary cell comprising a zinc electrode, a depolarizing electrode, an alkaline electrolyte interposed between and in contact with said electrodes, and a magnesium contact bonded to said zinc electrode.

2. A primary cell comprising a zinc electrode, a depolarizing electrode, an alkaline electrolyte interposed between and in contact with said electrodes, and a magnesium terminal bonded to said zinc electrode, said magnesium terminal comprising a spray-deposit of magnesium.

3. A primary cell comprising a zinc electrode, a depolarizing electrode, an alkaline electrolyte interposed between and in contact with said electrodes, and a magnesium terminal bonded to said zinc electrode, said magnesium terminal comprising a porous spray-deposit of magnesium, the pores of said deposit being impregnated with a water-repellent fluid.

4. A primary cell comprising a zinc electrode, a depolarizing electrode, an alkaline electrolyte interposed between and in contact with said electrodes, and a magnesium terminal bonded to said zinc electrode, said magnesium terminal comprising a porous spray-deposit of magnesium, the pores of said deposit being impregnated with oil.

5. A primary cell comprising a zinc electrode, a depolarizing electrode comprising a ferrous metal base carrying a coherent conductive body of depolarizing material, an alkaline electrolyte interposed between and in contact with said electrodes, and a magnesium contact integrally bonded to said zinc electrode.

6. A primary cell comprising a zinc electrode, a depolarizing electrode comprising a ferrous metal base carrying a coherent conductive body of depolarizing material, an alkaline electrolyte interposed between and in contact with said electrodes, a magnesium contact integrally bonded to said zinc electrode, said magnesium contact comprising a spray-deposit of magnesium, and oil impregnating said deposit.

7. A primary cell comprising a zinc electrode plate, a depolarizing electrode plate comprising a steel plate having a coherent conductive layer of depolarizing material bonded to a face thereof, a spacer of porous sheet material interposed between said zinc plate and said depolarizing layer, an alkaline electrolyte impregnating said spacer and in contact with said zinc and said depolarizing layer, and a spray-deposit of magnesium bonded to the outer face of said zinc electrode plate.

8. A primary cell comprising a zinc electrode plate, a depolarizing electrode plate comprising a steel plate having a coherent conductive layer of depolarizing material bonded to a face thereof, a spacer of porous sheet material interposed between said zinc plate and said depolarizing layer, an alkaline electrolyte impregnating said spacer and in contact with said zinc and said depolarizing layer, a spray-deposit of magnesium bonded to the outer face of said zinc electrode plate, and mineral oil impregnating said magnesium deposit.

9. A primary cell comprising a zinc electrode, a depolarizing electrode, an alkaline electrolyte interposed between and in contact with said electrodes, a magnesium terminal bonded to said zinc electrode, a metal terminal bonded to said depolarizing electrode, and insulative means cooperating with said terminals to define therewith an airtight enclosure for the cell while exposing portions of the outer surface of said terminals for connecting the cell into an external circuit.

10. A primary cell comprising a zinc electrode, a depolarizing electrode comprising a ferrous metal base carrying a coherent conductive body of depolarizing material, an alkaline electrolyte interposed between and in contact with said electrodes, a magnesium contact integrally bonded to said zinc electrode, and a magnesium contact integrally bonded to said ferrous metal base.

11. A primary cell comprising a zinc electrode, a depolarizing electrode comprising a ferrous metal base carrying a coherent conductive body of depolarizing material, an alkaline electrolyte interposed between and in contact with said electrodes, a spray-deposit of magnesium bonded to the outer face of said zinc electrode, and a spray-deposit of magnesium bonded to the outer face of said ferrous metal base.

12. A primary cell comprising a zinc electrode plate, a depolarizing electrode plate comprising a steel plate having a coherent conductive layer of depolarizing material bonded to a face thereof, an immobilized body of alkaline electrolyte interposed between and in contact with said zinc plate and said depolarizing layer, a porous spray-deposit of magnesium bonded to the outer face of said zinc electrode plate, a porous spray-deposit of magnesium bonded to the outer face of said steel plate, and a water-repellent fluid impregnating the pores of said spray deposits.

13. A dry cell comprising a zinc electrode, a depolarizing electrode comprising a metal base in intimate contact with a coherent conductive body of depolarizing material, said metal base serving as a terminal for said depolarizer, an alkaline electrolyte interposed between and in contact with said electrodes, and a terminal comprising magnesium in intimate contact with said zinc electrode.

SAMUEL RUBEN.

REFERENCES CITED

The following references are of record in the file of this patent:

UNITED STATES PATENTS

| Number | Name | Date |
|---|---|---|
| 441,130 | Brewer | Nov. 25, 1890 |
| 1,497,160 | Pouchain | June 10, 1924 |
| 1,578,494 | Wolff | Mar. 30, 1926 |
| 1,611,153 | Benner et al. | Dec. 21, 1926 |
| 1,676,007 | Csanyi | July 3, 1928 |
| 2,172,604 | Blackburn | Sept. 12, 1939 |
| 2,217,719 | Williams | Oct. 15, 1940 |
| 2,416,079 | Anthony | Feb. 18, 1947 |

FOREIGN PATENTS

| Number | Country | Date |
|---|---|---|
| 226,806 | Great Britain | Dec. 17, 1924 |
| 383,065 | Great Britain | Nov. 10 1932 |

OTHER REFERENCES

Bureau of Standards Circular 346, pages 285 and 286, 1927.